(12) United States Patent
Lofgren

(10) Patent No.: US 7,765,805 B2
(45) Date of Patent: Aug. 3, 2010

(54) ENHANCED SUPERCHARGING SYSTEM AND AN INTERNAL COMBUSTION ENGINE HAVING SUCH A SYSTEM

(75) Inventor: Isak Lofgren, Frolunda (SE)

(73) Assignee: Kasi Forvaltning i Goteborg AB, Savedalen (SE)

( * ) Notice: Subject to any disclaimer, the term of this patent is extended or adjusted under 35 U.S.C. 154(b) by 378 days.

(21) Appl. No.: 11/781,992

(22) Filed: Jul. 24, 2007

(65) Prior Publication Data

US 2009/0025696 A1 Jan. 29, 2009

(51) Int. Cl.
F02B 33/44 (2006.01)
F02B 33/00 (2006.01)
F02B 37/10 (2006.01)

(52) U.S. Cl. .............. 60/608; 60/609; 123/559.3; 123/561; 123/559.1

(58) Field of Classification Search ... 123/559.1–559.3; 60/606–609, 614, 624; F02B 37/00, 41/10
See application file for complete search history.

(56) References Cited

U.S. PATENT DOCUMENTS

| | | | | | |
|---|---|---|---|---|---|
| 1,706,391 | A | * | 3/1929 | Benjamin | 123/559.1 |
| 2,292,233 | A | * | 8/1942 | Lysholm | 123/559.1 |
| 2,583,651 | A | * | 1/1952 | Horning, Jr. | 60/614 |
| 2,585,029 | A | * | 2/1952 | Nettel | 60/606 |
| 3,795,231 | A | * | 3/1974 | Brille | 60/609 |
| 4,729,225 | A | * | 3/1988 | Bucher | 60/608 |
| 4,803,969 | A | * | 2/1989 | Hiereth et al. | 60/608 |
| 5,033,269 | A | * | 7/1991 | Smith | 60/607 |
| 5,079,913 | A | * | 1/1992 | Kishishita | 60/597 |
| 5,138,840 | A | * | 8/1992 | Oguchi et al. | 60/624 |
| 5,673,560 | A | * | 10/1997 | Hope | 60/606 |
| 5,729,978 | A | * | 3/1998 | Hiereth et al. | 60/607 |
| 6,681,574 | B2 | * | 1/2004 | Berglund et al. | 60/609 |
| 2003/0145597 | A1 | | 8/2003 | Kusase | |
| 2008/0256950 | A1 | * | 10/2008 | Park | 60/611 |
| 2010/0051363 | A1 | * | 3/2010 | Inoue et al. | 123/179.25 |

FOREIGN PATENT DOCUMENTS

| | | |
|---|---|---|
| DE | 102005003714 | 8/2006 |
| EP | 304384 A1 * | 2/1989 |
| EP | 331355 A1 * | 9/1989 |
| EP | 0420705 | 4/1991 |
| GB | 2390871 | 1/2004 |
| JP | 62131920 A * | 6/1987 |
| JP | 62195420 | 8/1987 |
| KR | 20040031221 | 4/2004 |
| WO | 2008075130 | 6/2008 |

OTHER PUBLICATIONS

International Search Report from PCT/SE2008/050883 dated Dec. 19, 2008.
International Preliminary Report on Patentability from PCT/SE2008/050883 dated Oct. 30, 2009.

* cited by examiner

Primary Examiner—Thai Ba Trieu
(74) Attorney, Agent, or Firm—Young & Thompson

(57) ABSTRACT

The invention refers to a supercharging system for an internal combustion engine incorporating in combination, a turbine, a compressor and an electrical driven system that is connected by any power transmission system to the crankshaft or any other vehicle drive shaft of an internal combustion engine and which are arranged along a common axis, where the turbine inlet is subjected to exhaust gases, causing the turbine wheel to rotate and thereby via the drive shaft causing mechanical rotating power.

9 Claims, 4 Drawing Sheets

ENHANCED SUPERCHARGING SYSTEM AND AN INTERNAL COMBUSTION ENGINE HAVING SUCH A SYSTEM

FIELD OF INVENTION

The present invention refers to a new, enhanced supercharging system for an internal combustion engine, and also to an internal combustion engine having such a system.

BACKGROUND OF THE INVENTION

Today there is a strong development going on in automotive industry in order to find systems for decreasing over all fuel consumption. There are many technical areas, which together make up for a good result.

One good way of improving internal combustion engine efficiency is to use some kind of supercharging device to increase intake manifold pressure in order to decrease the internal pumping losses. This in turn leads to decreased fuel consumption. It also makes it possible to downsize the engine without interfering with vehicle performance requirements.

There are several different supercharging devices available but they can all be sorted to one of the following types:

i) From a vehicle drive shaft, such as for instance a crankshaft, mechanically driven superchargers ii) Exhaust gas driven turbo superchargers iii) Electrical motor driven superchargers In some applications more than one supercharging device may be used at the same engine.

JP published patent application No 2000-230427 refers to an internal combustion engine with a supercharger, which via a clutch adapted to connect and disconnect the engine and the supercharger.

WO 2004/025097 A1 discloses a method for operating an internal combustion engine having a turbocharger with a separate compressor driven via a belt-drive from the engine crankshaft, said compressor being connected to the inlet of the turbocharger for increasing the pressure of the intake air delivered to the turbocharger. This means that the losses increase due to additional pressurized conduits between the separate compressor and the turbocharger, and also increased mechanical compressor losses at high motor speeds.

PURPOSE OF THE INVENTION

The purpose of the present invention is to combine all these different propulsion modes into one supercharging device in order to make benefit of the different properties associated with the different propulsion modes. The purpose is also to provide a possibility of converting overflow energy from the exhaust gases to electric energy, that can be used to recharge the battery if required. The supercharging device according to the invention shall be practically applicable on existing internal combustion engines and it shall be possible to propel the inlet supercharging device with all defined types of propulsion modes.

BRIEF DESCRIPTION OF THE DRAWINGS

Hereinafter the invention will be further described with reference to schematically shown embodiments.

BRIEF DESCRIPTION OF THE PREFERRED EMBODIMENT

Figure 1:
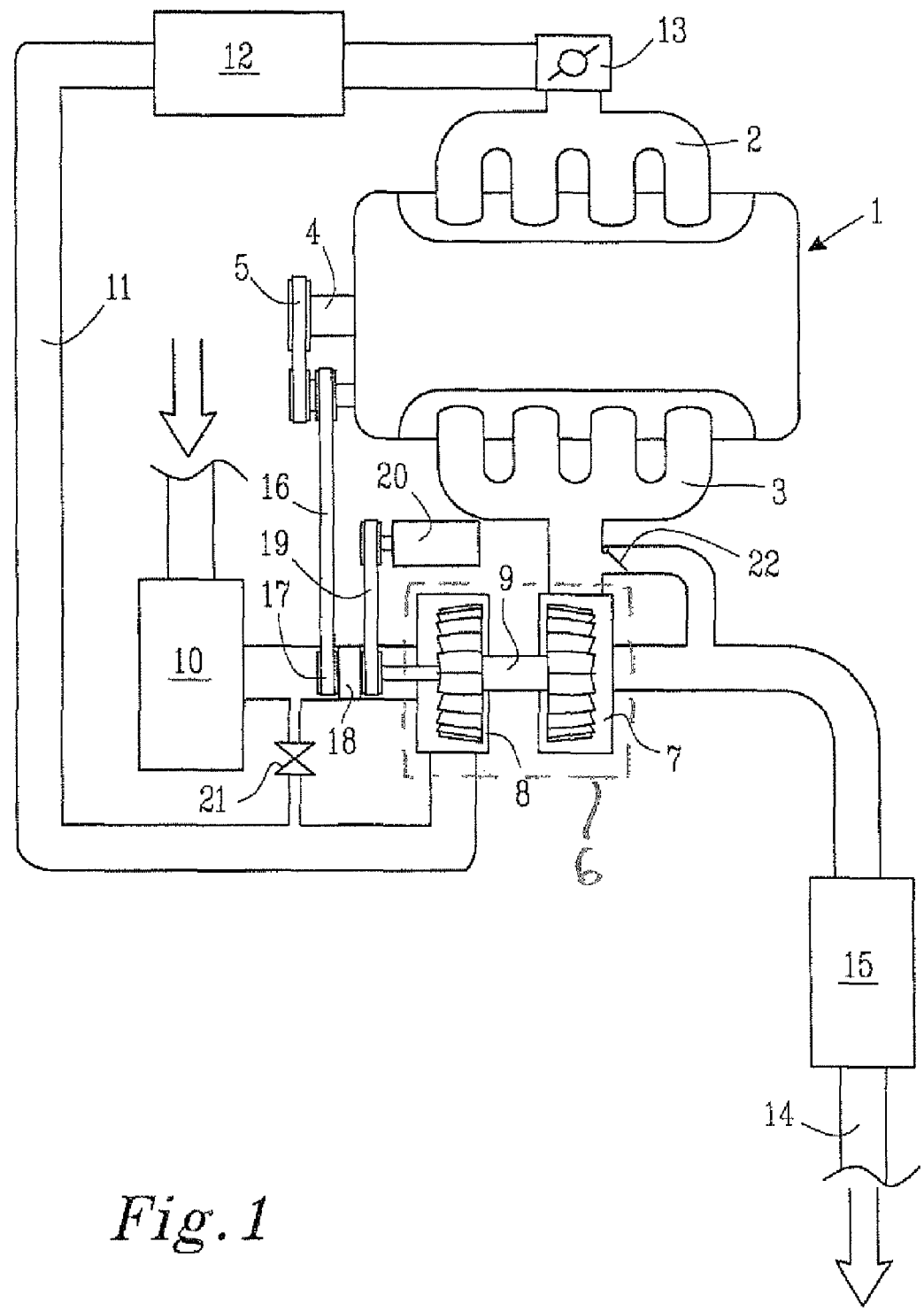
FIG. 1 is a schematical top view of an internal combustion engine equipped with a supercharging system according to the invention.

The proposed solution described in the drawing figures combines a mechanical supercharging system, an electrical supercharging/regenerating system and an exhaust gas propelled turbo supercharging system, where the two later are attached on a common shaft. This shaft in turn is connected by means of any type of clutch unit to the mechanically propelled shaft, coupled to a vehicle drive shaft, such as for instance the engine crankshaft.

FIG. 1 shows schematically an internal combustion engine 1 having an air intake manifold 2, and an exhaust gas manifold 3, In the embodiment schematically illustrated there are four air intake pipes intimating that the engine has four cylinders, although the number of cylinders can be higher as well as lower. The engine 1 has a crankshaft 4, which is equipped with a pulley 5.

A supercharging device 6 is attached directly to the engine block in a similar way that turbocharging systems are attached today. This turbocharging device 6 incorporates a turbine 7 and a compressor 8 arranged on a common shaft 9, where the turbine is driven by the exhaust gases from the exhaust gas manifold 3, and the co-rotating compressor impeller 8 is compressing ambient air which is sucked in via an air filter 10. The compressed air is in a duct 11 via an intercooler 12 and a throttle 13 introduced in the air intake manifold 2, whereas the exhaust gases after having passed the turbine are evacuated via an exhaust gas conduit 14 with a catalyzer 15.

The pulley 5 rotating with the crankshaft 4 of the engine, transfers via a transmission 16, such as for instance a belt drive, rotation to a shaft 17, which via a clutch unit 18, can be coupled to the shaft 9, on which the turbine 7 and the compressor 8 are arranged, thus that the rotation of the crankshaft 4 can be transferred to the shaft 9 common for the compressor and turbine, in situations where the turbine has not reached its working area.

For regeneration of rotary power to electric power, the common shaft 9 is connected via a transmission 19 to an electric machine 20, a battery or the like. The engine also incorporates an engine brake valve 21 and a wastegate 22.

For fitting a supercharging device as described to existing internal combustion engines it is necessary to design this device in such a way that it compiles with existing power conversion nodes, i.e. the exhaust gas intake has to be situated for corresponding to the exhaust manifold outlet and the mechanically driven power conversion node has to be located in line with existing outputs, such as for instance the belt drive for auxiliary loads from the internal combustion engine.

The following technical advantages of the supercharging device as described can be identified, and which mostly arise from the possibility to use each separate sub-system in this concept at its best efficiency interval:

No, or very low mechanical compressor losses at high engine speeds.

Regeneration of energy, to electric power, from the supercharging device, when it has its best efficiency.

The compressor shaft may help the turbine to reach its working area quicker.

One supercharging device, one axis, three different driving modes.

No losses due to additional pressurized pipes between compressor and turbine.

No turbo-lag.

Easy to implement on almost any of today's existing combustion engines.

Possibility to regenerate overflow power from the exhaust gases to electrical power via the electric motor/generator.

Possible to momentary assist the mechanical supercharging system by electrical drive if needed, i.e. during very low engine speeds or to maintain boost pressure during fast speed transients.

Gains in terms of engine room space.

Figure 2:
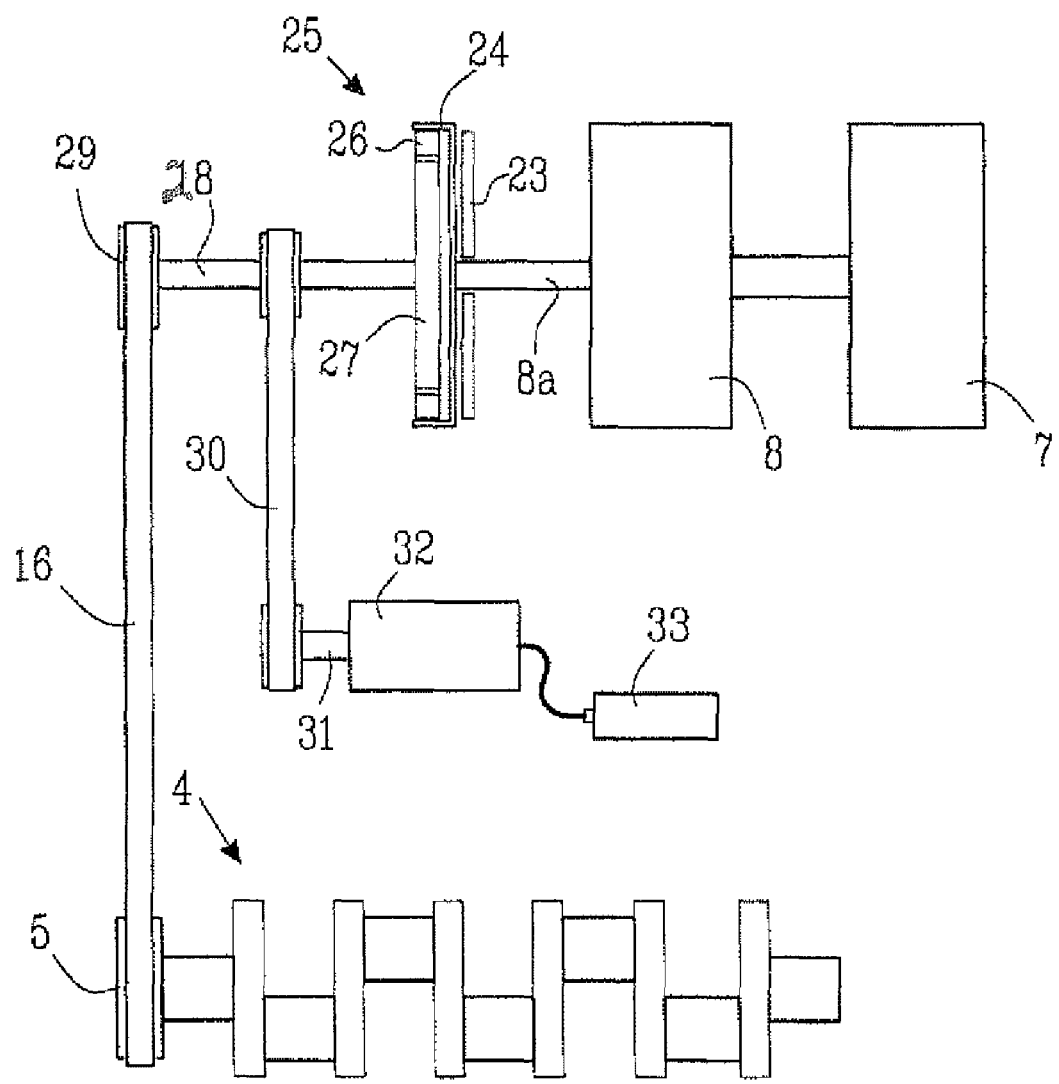
FIG. 2 illustrates schematically in block form a principal lay out for the supercharging system according to the present invention.

FIG. 2 illustrates schematically in block form a principal lay out for the supercharging system according to the present invention, in which is shown a turbine 7 and a compressor 8 arranged on a compressor shaft 8a. Via a clutch 23, which for instance can be a one way clutch, this compressor shaft 8a can be connected to and disconnected from a ring 24 forming part of a planetary gear 25, having planet wheels 26 connected to a planet wheel carrier and cooperating with a sun wheel 27, which is fitted to a shaft 28 rotatably supported and provided with a pulley 29, which via a transmission, such as a belt drive 16, is connected to a pulley 5 arranged on a drive shaft of the engine, such as the crankshaft 4 thereof, or the like. The planet wheel carrier in turn is via a transmission 30, such as a belt drive, connected to an shaft 31 of an electric motor 32, which is controlled by means of a control electronic device 33.

Figure 3:
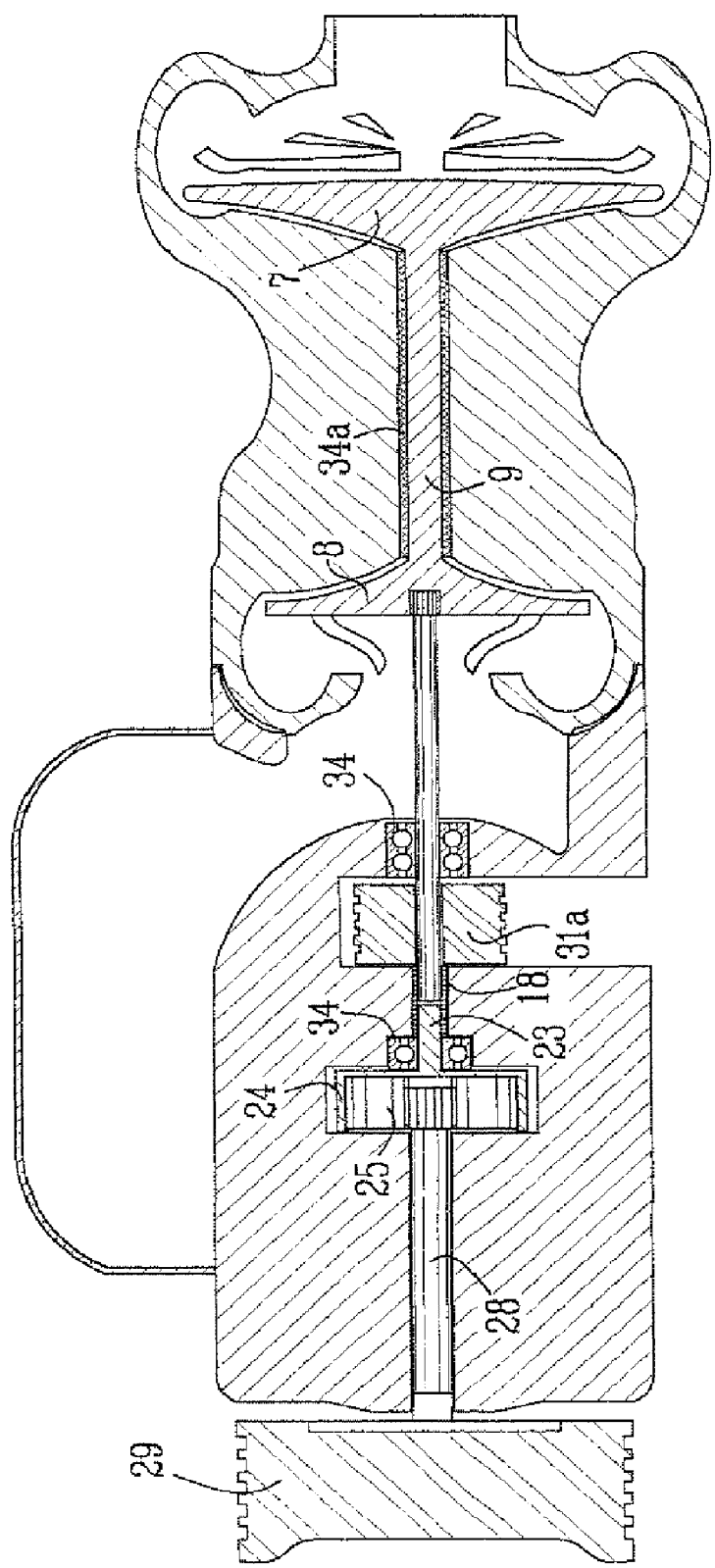
FIG. 3 shows schematically in a side view an embodiment of the supercharging system according to the invention.
Figure 4:
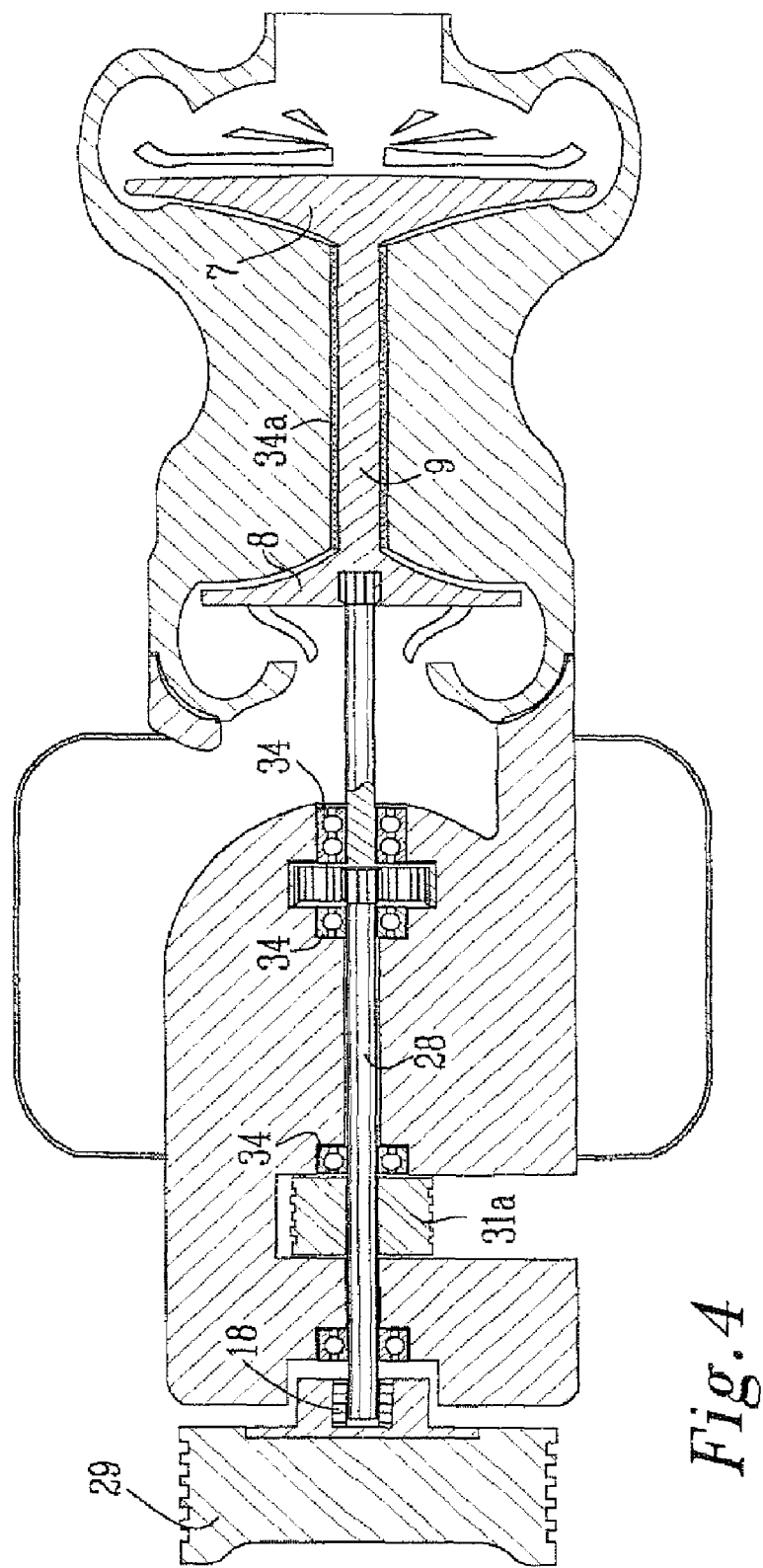
FIG. 4 is a further schematically shown embodiment of the supercharging system, according to the invention.

FIG. 3 and FIG. 4 illustrate schematically two slightly differing embodiments of the supercharging device according to the present invention.

Thus, FIG. 3 illustrates a turbine 7 connected via a shaft 9 to a compressor wheel 8. The shaft 9 is supported in bearings 34, 34a, and carries at its end, remote from the turbine 7 a pulley 31a, which via a not shown transmission, such as for instance a belt drive is coupled to a not shown generator in order to recover excessive energy from the turbine. In this embodiment of the supercharging device, the shaft 9 can via a clutch 18, 23 be connected to and disconnected from a further shaft 28, whereby the shafts 9, 28 when the clutch is in engaged position interconnects the two shafts as a common axis. this second shaft 28, which is supported in a bearing 34 and is equipped with a planetary gear 25 for changing up the speed. At its opposite side this further shaft 28 carries a further pulley 29, which via a (not shown) transmission, such as a belt drive, is connected to the crankshaft or any other driving shaft of the combustion engine for driving the compressor 8 before the turbine has reached its working speed.

In FIG. 4 is shown another embodiment of a supercharging device which is slightly different from that as shown in FIG. 3.

In this embodiment of a supercharging device according to the invention there is like in FIG. 3 provided a shaft 9 carrying a turbine 7 and a compressor 8, and which shaft is journalled in rolling bearings 34, and plain bearing 34a. The shaft 9 is connected to the ring 24 of a planetary gear 25 which has an opposite shaft 28 coupled to the planet wheels of the planetary gear 25. At a short distance from the planetary gear the shaft 28, which forms a continuous axis with the shaft 9, is equipped with a pulley 31a, which via a not shown transmission, such as for instance a belt drive is coupled to a not shown generator. After that pulley 31a there is provided a further shaft, which via a clutch 18 can be connected to and disconnected from the shaft 28, and this further shaft carries a further pulley 29, which via a (not shown) transmission, such as a belt drive, is connected to the crankshaft or any other driving shaft of the combustion engine.

For easier description of the combined operation of this device the following sub systems are defined.

Turbo Charged System

Turbo charging means good efficiency when activated, but is dependent on high rotational speed for the exhaust gases to have enough power to propel the turbine fast enough to build up substantial intake manifold pressure.

Turbo charging has one major advantage in comparison to all other super charging systems, as it uses overflow energy in the exhaust gases to charge the intake manifold air.

By doing so no extra fuel is consumed in order to build up a good intake manifold pressure. The principle intake manifold pressure as a function of rotational speed has the following appearance:

Super charging means increased intake manifold pressure from low rotational speeds and a proportional increase of intake manifold pressure coupled to the rotational speed. Thus at higher rotational speed the efficiency of the supercharger becomes very poor due to high internal friction and heat losses.

Electrical Super Charged System

Electrical super charged systems work in the same way as mechanically ones but with the advantage that they provide the possibility to control the intake manifold pressure to a given level by providing power when it's needed but also to regenerate power from the exhaust gases when possible.

Existing Power Electronics Monitoring Systems

Algorithms for energy management are necessary to be able to regenerate power into the electric system of the vehicle. Systems for this are already developed in many vehicles of today. These systems are designed to keep track on the present auxiliary loads as well as monitoring the battery status. If there is a need for the battery to be recharged and power is available due to the fact that not all auxiliary systems are used, the system may raise the generator load voltage to start recharging the system.

The algorithms can be reconfigured so that they in addition to theres present application also regenerates the power provided from this supercharging device into electric power when the battery is not fully charged. By doing so for example during high-way driving the electric system would be better prepared for example for start-stop applications where a fully charged battery is essential for a good start-stop operation.

In order to decide how and when the electric machine should act new algorithms are needed to support the regenerating mode. By using existing hardware already in production, such as rpm-sensors, pressure and flow sensors together with modifications of existing electric monitoring systems, this could be done.

Power Split and Defined Propulsion Modes

In order to clarify the different propulsion modes of this new invention the following power conversion nodes have been defined:

A: Chemical power (flow, pressure)=>Mechanical power (rotational speed, Torque)

B: Mechanical power (rotational speed, Torque)=>Chemical power (flow, pressure)

C: Generative: Electrical power (I, U)=>Mechanical power (rotational speed, Torque)

Regenerative: Mechanical power (rotational speed, Torque)=>Electrical power (I, U)

SUMMARY

This invention provides a relatively easy way of reducing over all fuel consumption by combining already existing systems in a new way. If this invention could be combined on an engine equipped with a start-stop system this would further "boost" this system as well by increasing the amount of times one can start the engine before the electronic monitoring system has to step in and shut down the start-stop application to avoid battery depletion.

The invention is not limited to the embodiments schematically illustrated in the drawings and described with reference thereto, but variants and modifications are possible within the scope of the appended claims.

The transmissions described have been illustrated as belt drives, but any type of appropriate transmission units can be used. The clutch units mentioned can be mechanical one way clutches of any appropriate type, although electric clutches, viscous couplings and the like, are also possible.

The invention claimed is:

1. A method for operating a supercharging system for an internal combustion engine including an exhaust gas propelled turbo supercharging system, a mechanical supercharging system, and an electrical supercharging/regenerating system, wherein, said exhaust gas propelled turbo supercharging system includes a turbine and a compressor, said compressor being arranged on a compressor shaft, said mechanical supercharging system coupling a crank shaft of the engine to said compressor, and said electrical supercharging/regenerating system coupling an electric motor to said compressor, said exhaust gas propelled turbo supercharging system, mechanical supercharging system, and electrical supercharging/generating system are arranged on a common axis including said compressor shaft and a drive shaft, said compressor shaft and said drive shaft being connected via a planet gear, which electric motor/generator is connected to said drive shaft and a power transmission connects a crankshaft of the internal combustion engine to said drive shaft via an one way clutch unit, comprising the steps of:
    operating the supercharger/regenerating system in a first operating mode where said compressor in the supercharger/regenerating system is driven from said crankshaft and before said turbine has reached a speed of working area;
    operating the supercharger/regenerating system in a second operating mode where said compressor in the supercharger/regenerating system is driven from said turbine, wherein said generator receives power from said turbine when said turbine generates an excessive energy; and
    operating the supercharger/regenerating system in a third operating mode where said compressor in the supercharger/regenerating system is driven from said electrical motor,
        wherein when the internal combustion engine is operating in at least one of at low engine speeds and fast speed transients, the electric motor is generated to maintain boost pressure of compressed air to be delivered into said internal combustion engine.

2. A supercharging system for an internal combustion engine, comprising:
    a turbocharging device including an exhaust gas propelled turbine and a compressor,
        wherein said compressor is arranged on a compressor shaft;
    a planet gear coupled to said compressor shaft and a drive shaft;
    a one way clutch;
    a power transmission connecting a crankshaft of the combustion engine to said drive shaft via the one way clutch unit; and
    an electric motor/generator,
        wherein an additional transmission connects a drive shaft of said electric motor/generator to said drive shaft, and
        wherein the compressor of the turbocharging device delivers compressed air to the internal combustion engine during engine operation.

3. The supercharging system according to claim 2, wherein,
    said compressor shaft is connected to a sun gear of said planet gear, and
    said drive shaft is connected to a ring gear of said planet gear.

4. The supercharging system according to claim 2, wherein, said turbine and said compressor are arranged along a common axis with an inlet of the turbine subjected to exhaust gases, the exhaust gases causing a wheel of the turbine to rotate and thereby cause an impeller of the compressor to rotate at the speed of the turbine wheel, thereby compressing ambient air for delivery to an engine air intake, and
    the power transmission connecting the crankshaft to said drive shaft functions as a driving device for transferring rotation to the common axis associated with the compressor before the turbine has reached a lowest working area.

5. The supercharging system according to claim 4, wherein,
    said electric motor/generator is an electric generator, and
    said electric generator is connected to said drive shaft via said additional transmission for regenerating overflow energy from the exhaust gas driven turbine into electric power.

6. A supercharging system for an internal combustion engine, comprising:
    an exhaust gas propelled turbo supercharging system;
    a mechanical supercharging system; and
    an electrical supercharging/regenerating system,
    wherein,
        said exhaust gas propelled turbo supercharging system includes a turbine and a compressor, said compressor being arranged on a compressor shaft,
        said mechanical supercharging system couples a crankshaft of the engine to said compressor,
        said electrical supercharging/regenerating system couples an electric motor/generator to said compressor,
        said exhaust gas propelled turbo supercharging system, mechanical supercharging system, and electrical supercharging/regenerating system are arranged on a common axis including said compressor shaft and a drive shaft,
        said compressor shaft and said drive shaft is connected via a planet gear,
        said electric motor/generator is connected to said drive shaft,
        a power transmission connects the crankshaft of the internal combustion engine to said drive shaft via a one way clutch unit,
    wherein said compressor of said exhaust gas propelled turbo supercharging system delivers compressed air to the internal combustion engine during engine operation.

7. The supercharging system according to claim 6, wherein,
  said compressor shaft is connected to a sun gear of said planet gear, and
  said drive shaft is connected to a ring gear of said planet gear.

8. An internal combustion engine, comprising:
  an air intake manifold for supply of combustion air to at least one combustion chamber;
  an exhaust manifold for discharge of exhaust gases from the at least one combustion chamber;
  a supercharging system including:
    i) a turbocharging device with a turbine wheel and a compressor, said turbine wheel and compressor being arranged along a common shaft,
    ii) a planet gear coupled to said common shaft and to a drive shaft, and
    iii) an electric motor/generator connected to said drive shaft, wherein,
    a turbine inlet is connected to the exhaust manifold for being subjected to exhaust gases, causing the turbine wheel to rotate and thereby, via the common shaft, causing an impeller of the compressor to rotate at the speed of the turbine wheel, thereby compressing ambient air for delivery to the engine air intake manifold; and
  a rotating engine crankshaft, wherein said rotating engine crankshaft, via a transmission, is connectable via a one way clutch unit to said drive shaft for transfer of rotation force for driving the compressor before the turbine has reached a lowest working area,
  wherein the compressor of the turbocharging device delivers compressed air to the internal combustion engine during engine operation.

9. The internal combustion engine according to claim 8, wherein the transmission connecting the rotating engine crankshaft to said drive shaft is a belt drive.

* * * * *